United States Patent [19]

Ashley

[11] Patent Number: 5,122,728
[45] Date of Patent: Jun. 16, 1992

[54] COUPLED INDUCTOR TYPE DC TO DC CONVERTER WITH SINGLE MAGNETIC COMPONENT

[75] Inventor: Christopher R. Ashley, Redondo Beach, Calif.

[73] Assignee: Hughes Aircraft Company, Los Angeles, Calif.

[21] Appl. No.: 633,835

[22] Filed: Dec. 26, 1990

[51] Int. Cl.[5] .............................................. G05F 1/577
[52] U.S. Cl. ...................................... 323/282; 323/267
[58] Field of Search ............... 323/267, 282, 290, 351, 323/16; 363/124

[56] References Cited

U.S. PATENT DOCUMENTS

| | | | |
|---|---|---|---|
| 3,093,790 | 6/1963 | Ehret | 323/290 |
| 3,569,818 | 3/1971 | Dahlinger | 323/282 |
| 4,187,458 | 2/1980 | Milberger et al. | 323/290 |
| 4,257,087 | 3/1981 | Cuk | 363/16 |
| 4,262,328 | 4/1981 | Bloom et al. | 363/16 |
| 4,300,191 | 11/1981 | Baronowski et al. | 363/17 |
| 4,355,352 | 10/1982 | Bloom et al. | 363/16 |
| 4,674,019 | 6/1987 | Martinelli | 363/20 |
| 4,999,568 | 3/1991 | Gulczynski | 323/351 |

OTHER PUBLICATIONS

White et al., "Two-Inductor Boost and Buck Converters", Jun. 1987, Power Electronics Specialist Conference; pp. 387–392.

Primary Examiner—Jeffrey Sterrett
Attorney, Agent, or Firm—Gordon R. Lindeen, III; Steven M. Mitchell; Wanda K. Denson-Low

[57] ABSTRACT

A coupled inductor type boost DC to DC converter with a single multipurpose magnetic component. The invention includes a conventional switch for converting an input DC voltage to a signal having a time varying waveform. The switch Q1 has a pole terminal connected to a source of input voltage, a control terminal and first and second throw terminals. The single inductive element includes a first winding $LN_1$ connected between an output terminal of the switch and an input terminal of the converter and a second winding $LN_2$ connected between the second throw terminal of the switch and an output terminal of the converter. In a first embodiment, the invention further includes a winding $LN_3$ of the inductive element connected at a first end to the control terminal of the switch which provides a level shifting circuit for shifting the level of a drive signal applied to the control terminal of the switch.

23 Claims, 3 Drawing Sheets

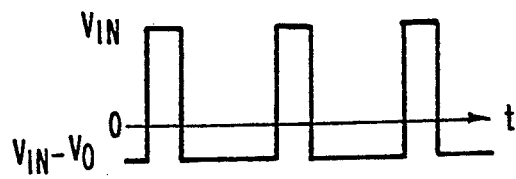
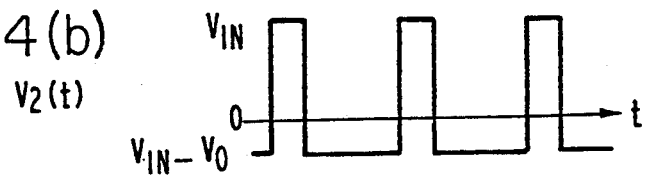
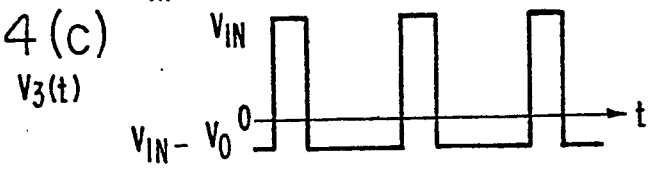
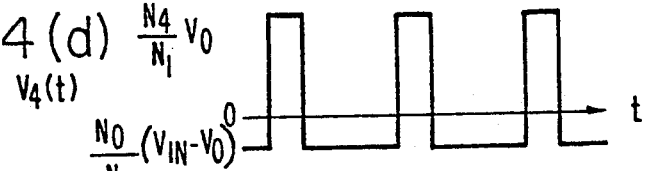
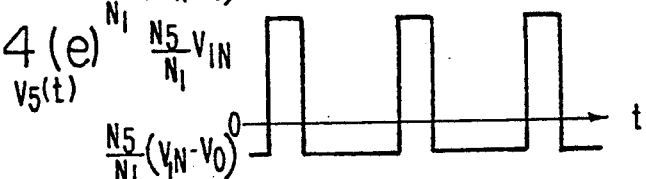
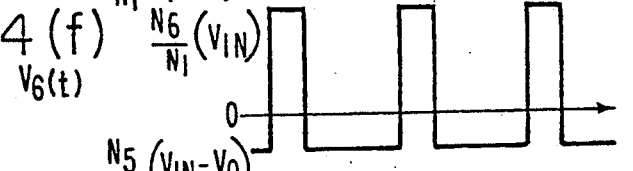
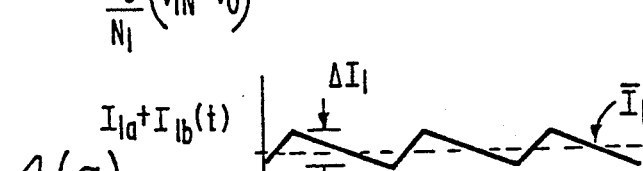
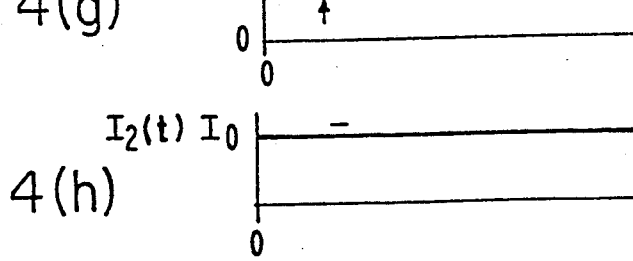
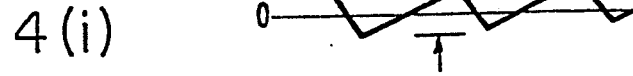

COUPLED INDUCTOR TYPE DC TO DC CONVERTER WITH SINGLE MAGNETIC COMPONENT

BACKGROUND OF THE INVENTION

1. Field of the Invention

The present invention relates to power conversion circuits and systems. More specifically, the present invention relates to DC to DC converters.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

DC to DC converters are known in the art. DC to DC converters function to efficiently change a DC voltage from one level to another. This conversion is typically accomplished with switching mode power transistors which convert an input DC voltage to an AC square wave and then convert the AC square wave to a higher or lower voltage amplitude via the turns ratio transformation of a power transformer. The transformer output square wave is then rectified and filtered to generate the new DC voltage level at higher or lower voltage relative to a different ground reference than the input DC voltage power level.

DC to DC converters are often used to provide regulated power for electronic and electrical systems from a source of unregulated power. A variety of DC to DC converters are known in the art including buck, boost and buck-boost converters. See "Two-Inductor Boost and Buck Converters" by J. L. White and W. J. Muldoon published in the IEEE 18th Annual Power Electronics Specialists Conference June 21-26, 1987.

Boost type DC to DC converters are particularly useful. Boost type DC to DC converters convert an input direct current (DC) signal at a first lower voltage to an output DC voltage at a second higher voltage level.

Coupled inductor type boost DC to DC converters utilize an inductor to provide DC level shifting. Coupled inductor type boost DC to DC converters are widely used due to the inherent ripple current reduction capability of the inductive component. However, conventional coupled inductor type boost DC to DC converters typically utilize at least three separate magnetic components for providing the functions of energy storage, power switch drive, input current ripple cancellation and regulated low voltage supply generation. The weight, size and cost associated with multiple magnetic components has tended to limit the desirability of conventional coupled inductor type boost DC to DC converters for certain applications, e.g. spacecraft power systems.

Thus, there is a need in the art for a small, light weight, low cost improved coupled inductor type boost DC to DC converter design capable of performing the functions of energy storage, power switch drive, input current ripple cancellation and regulated low voltage supply generation.

SUMMARY OF THE INVENTION

The need in the art is addressed by the present invention which provides a coupled inductor type boost DC to DC converter with a single multi-purpose magnetic component. The invention includes a conventional switch for converting an input DC voltage to a signal having a time varying waveform. The switch Q1 has a pole terminal connected to a source of input voltage, a control terminal and first and second throw terminals. The single inductive element includes a first winding $LN_1$ connected between an output terminal of the switch and an input terminal of the converter and a second winding $LN_2$ connected between the second throw terminal of the switch and an output terminal of the converter.

In a first embodiment, the invention further includes a winding $LN_3$ of the inductive element connected at a first end to the control terminal of the switch which provides a level shifting circuit for shifting the level of a drive signal applied to the control terminal of the switch.

In a second embodiment, the invention includes a winding $LN_4$ of the first inductive element connected at a first end to the first throw terminal of the switch Q1 and at a second end to a source of reference potential to thereby provide an input current ripple cancellation circuit.

In a third embodiment, the invention includes an auxiliary regulated power supply circuit including a winding $LN_5$ of the first inductive element connected at one end to the source of reference potential, a first diode CR2 connected at a first end to a second end of the winding $LN_5$ of the first inductive element, a winding $LN_6$, of the first inductive element, connected at a first end thereof to a second end of the first diode, a capacitor C4 connected to the second end of the first diode, and a second diode CR3 connected at a first end to a second end of the winding $LN_6$ of the first inductive element and at a second end to an output terminal of the regulated auxiliary power supply circuit.

Hence, the inductor coupled DC to DC converter of the present invention provides conventional energy storage, power switch drive level shifting, input current ripple cancellation, and regulated low voltage auxiliary power supply generation with a single magnetic component. The invention allows for a significant reduction in parts count, unit size and cost over comparable prior designs.

BRIEF DESCRIPTION OF THE DRAWINGS

FIGS. 4(a) through 4(i) illustrate voltage and current waveforms in the coupled inductor circuit of FIG. 3.

DESCRIPTION OF THE INVENTION

Illustrative embodiments and exemplary applications will now be described with reference to the accompanying drawings to disclose the advantageous teachings of the present invention.

Figure 1A:
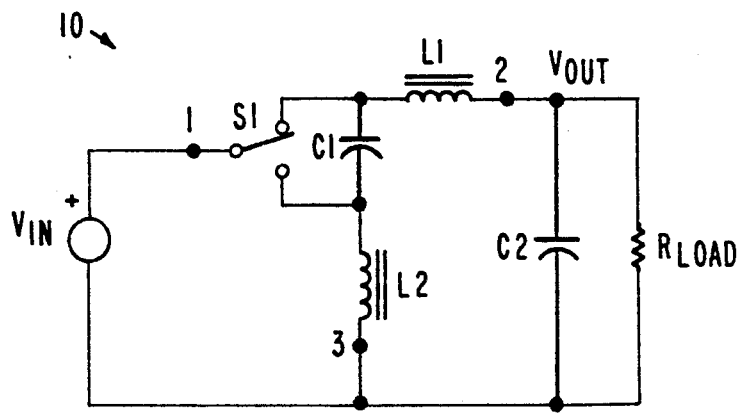
FIG. 1(a) is an illustrative schematic diagram of a two inductor boost converter.

The topology of the coupled inductor DC to DC converter of the present invention is best illustrated with a review of the family origins thereof. The topology in its most basic form is a two (choke) inductor boost converter 10 with a single-pole-double-throw switch S1 as shown in FIG. 1(a). The pole of the switch S1 is connected to one terminal of an input voltage source $V_{in}$. A first throw terminal of the switch S1 is connected to one end of a first inductor L1 while a second throw terminal is connected to one end of a second inductor L2. A first capacitor C1 is connected between the first and second throw terminals of the switch S1. An output capacitor C2 is connected between the second terminals of the first and second inductors L1 and L2. The switch S1 converts the input DC voltage to an AC quasi-square wave. An output voltage $V_{out}$ is developed across a load represented by a resistor $R_{load}$.

Figure 1B:
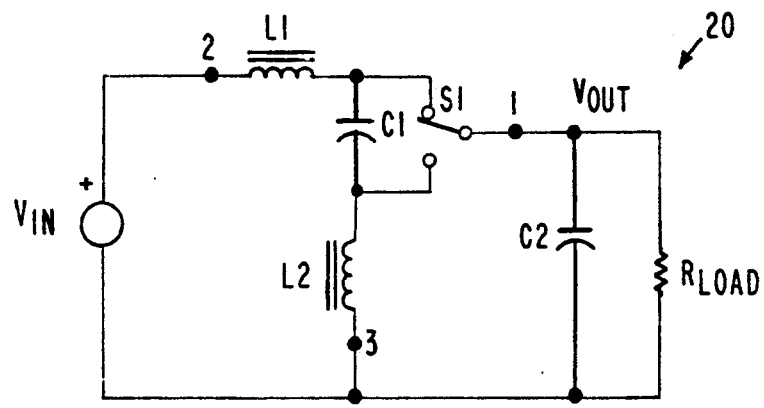
FIG. 1(b), is an illustrative schematic diagram of a coupled inductor buck converter.
Figure 1C:
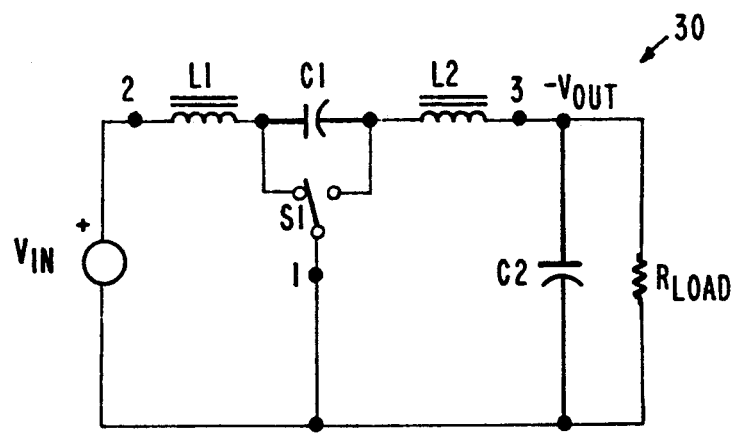
FIG. 1(c), is an illustrative schematic diagram of a coupled inductor Cuk converter.

As shown in FIG. 1(b), if the terminals of the topology are rotated one position clockwise, a coupled inductor buck converter 20 with continuous input and output current is derived. If the basic power stage terminals are rotated one position counter-clockwise, as shown in FIG. 1(c), a "Cuk" converter 30 is derived.

Like the "Cuk" converter, the input and output currents of both topologies are non-pulsating. Since L1 and L2 have essentially the same AC voltage, a single coupled inductor can replace the two individual inductors. Output ripple current is dramatically reduced by the introduction of a small inductance in series with the output leg of the coupled inductor.

Figure 2:
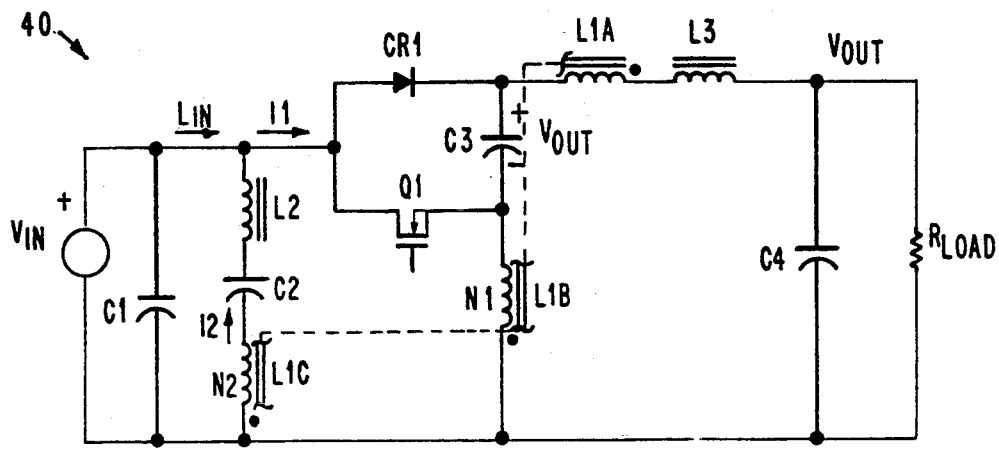
FIG. 2 is a simplified schematic diagram of the coupled inductor boost converter of the present invention.

FIG. 2 is a simplified schematic diagram of the coupled inductor boost converter 40 of the present invention. A power MOSFET transistor Q1 and a diode CR1 form the single-pole double-throw switch. The main choke L1 has three windings. L1A and L1B are the main coupled inductor power windings; L1C is an auxiliary winding used to cancel input ripple current. C3 is the energy transfer capacitor buried inside the topology. C2 is a DC blocking capacitor for the input ripple cancellation circuit. C1 and C4 are the input and output capacitors. L2 is the input ripple cancellation inductor. L3 is the output ripple reduction choke.

This topology has the DC characteristics of a boost converter. If the voltage across the output capacitor C4 is defined to be $V_{out}$, the voltage across the energy transfer capacitor C3 must equal the $V_{out}$ in the steady state. During the "on" time, the voltage across L1A (and therefore L1B) is equal to the input voltage $V_{in}$. During the "off" time, the voltage across L1A is $V_{in}$ minus $V_{out}$. Since the average voltage across the inductor L1A must be zero, $$DV_{in}+(1-D)(V_{in}-V_{out})=0 \qquad [1]$$

where D is the duty cycle of the switch which varies from 0 to 1 as controlled by the base drive to the transistor Q1 (not shown). Solving for $V_{out}$ yields, the standard DC boost converter transfer function:

$$V_{out}=V_{in}/(1-D) \qquad [2]$$

Low output current ripple is achieved by the introduction of the ripple reduction choke L3. L3 forces all of the L1 magnetizing current to flow in winding L1B. If the energy transfer capacitor C3 is very large (i.e., no significant ripple voltage), the voltage across C3 is equal and opposite to the voltage across the output capacitor C4. Also, the voltage across L1A is equal and opposite to the voltage across L1B. As a result, the voltage across L3 and the ripple current in L3 approach zero and the output ripple voltage approaches zero. The input ripple cancellation circuit uses a current cancellation technique in which an AC current is injected which is equal to but 180 degrees out-of-phase with the ripple current flowing in L1. When the two currents are added together, the net AC current approaches zero. The condition for zero ripple is derived as follows from the differential equations for the coupled inductor power stage during the "on" time (assuming a large blocking capacitor, C2):

$$dL1/dt=(V_{in}/L1)+(N_2/N_1)dL2/dt \qquad [3]$$

and $$dL2/dt=(N_2/N_1)V_{in}/L2 \qquad [4]$$

where L1=L1A=L1B, $N_1$ and $N_2$ are the number of turns on the windings L1B and L1C respectively, of L1. Zero ripple occurs when $dL1/dt=dL2/dt$. Therefore, given $n \triangleq N_2/N_1$;

$$(V_{in}/L1) + (1/n)dL2/dt = dL2/dt \qquad [5]$$
$$V_{in}/L1 = ((n - 1)/n)dL2/dt \qquad [6]$$
$$V_{in}/L1 = (n - 1)/n)(1/n)V_{in}/L2 \qquad [7]$$

Solving for L2 as a function of L1 and n yields:

$$L2=L1(n-1)/n^2 \qquad [8]$$

Typically, the turns ratio n will be on the order of 3 so that L2 will be only $0.2222 \times L1$. Since the inductance of L2 is quite small and it only carries the AC ripple current, L2 will be significantly smaller than a conventional EMI filter choke designed to carry the full DC input current of the converter.

Figure 3:
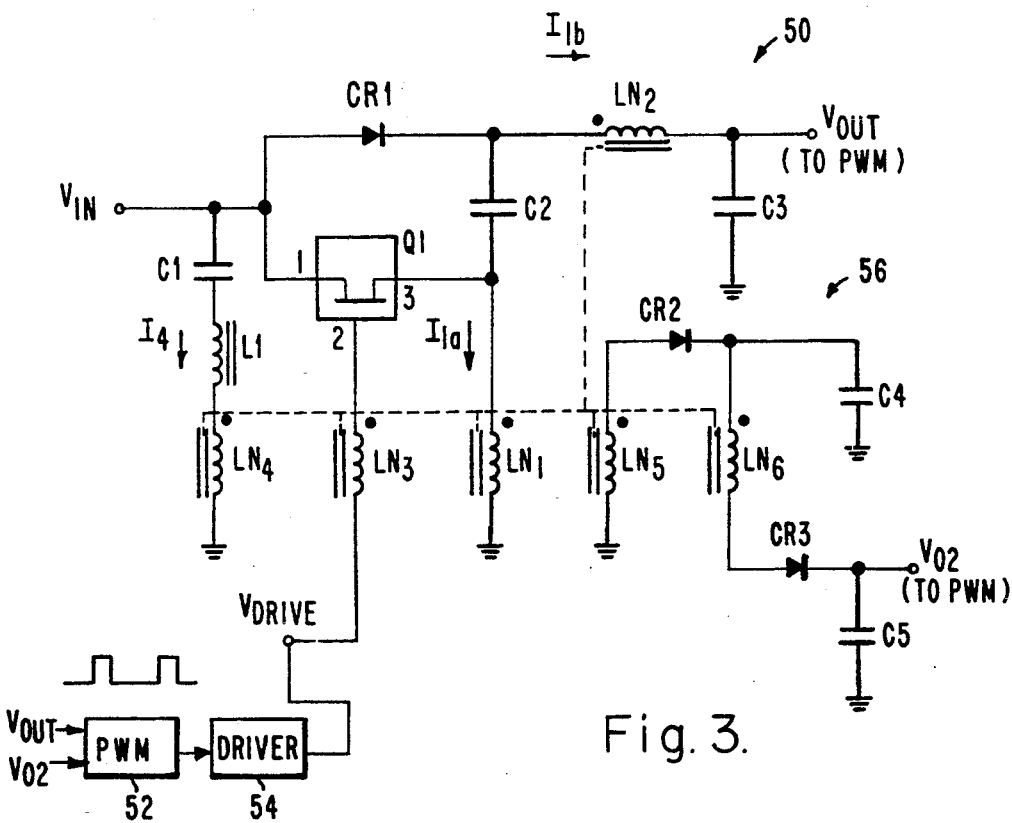
FIG. 3 shows a schematic diagram of a preferred embodiment of the coupled inductor boost converter of the present invention.

FIG. 3 shows a schematic diagram of a preferred embodiment of the coupled inductor boost converter 50 of the present invention. The embodiment of FIG. 3 is a coupled-inductor boost DC to DC converter topology which uses fixed frequency pulse-width modulation to regulate output voltage at a constant value over a relatively wide range of input voltage and output current. The embodiment of FIG. 3 is identical to that of FIG. 2 with the exception that the input capacitor C1 is combined with the DC blocking capacitor C2 as a single capacitor C1 in series with the inductor L1; the inductors L1A and L3 are combined in a single winding $LN_2$. Windings $LN_1$ and $LN_2$ are DC inductors and perform the energy storage function for the converter topology. Winding $LN_3$ provides level shifting of the zero volt referenced drive signal in order to control the state of the switch Q1 such that the voltage waveform at terminal Q1-2 referenced from Q1-3 is the same as the voltage at $V_{drive}$ relative to ground. Winding $LN_4$ has a reduced turns-ratio (i.e., $N_4/N_1<1$) allowing selection of L2 (using equation [10] below). Windings $LN_5$ and $LN_6$ are included to provide a regulated auxiliary low voltage supply. The switch Q1 is a power MOSFET and requires a positive voltage on pin 2 relative to pin 3 in order to turn on and is off for a drive voltage of approximately zero volts. The same configuration can be used to drive a current driver switch such as a bipolar transistor.

In steady state operation, the inductors appear as shorts and the capacitors appear as opens (assuming throughout that the resistance of the windings is negligible). Thus, the input voltage $V_{in}$ (typically 25-48 volts) is applied to the input capacitor C1. Since in this boost configuration, the output voltage $V_{out}$ (typically 50 volts) is higher than the input voltage $V_{in}$, the diode CR1 is back biased and off. With the switch Q1 off, the voltage on C2 is equal to the voltage on C3. Then a drive voltage (e.g., 15 volts) is applied to the base of the switching transistor Q1 at pin 2 by a pulse width modulator circuit 52 via a driver 54. The pulse width modulator 52 may be implemented with a UC1842 made by Unitrobe Corp. in Lexington, Mass., while the driver 54 may be implemented with a TSC4424 made by Teledyne Semiconductor Inc.. When the switch Q1 (a power MOSFET transistor) comes on, a short is provided between pins 1 and 3. Thus, the voltage on pin 3 increases to $V_{in}$, e.g., 40 volts. At that point, the input voltage is applied to pin 1 and across $LN_3$. With say 15 volts at the bottom of the inductor $LN_3$ and 40 volts across $LN_3$, a net 55 volts is applied to pin 2 of the transistor switch Q1, keeping it on. The voltage at the top of the energy transfer capacitor C2 jumps from $V_{in}$ minus a diode drop e.g., 39.3 volts to $V_{in}$ plus $V_{out}$ e.g., 90 volts. The ratio between the input voltage and the output voltage is given from equation [2] as:

$$V_{out}/V_{in} = 1/(1-D) \qquad [9]$$

As the voltage rises across $LN_1$, the current $I_{1a}$ in $LN_1$ rises. This induces a current in $LN_4$ in the opposite direction. By choosing the turns ratio in accordance with equation [10] below, a cancellation of input ripple current may be achieved.

$$L2 = LN_1 \times (n-1)/n^2 \qquad [10]$$

where $n = N_1/N_4$ where $N_1$ is the number of turns in the winding of the inductor $LN_1$ and $N_4$ is the number of turns in the winding of the inductor $LN_4$.

When the switch Q1 is on, the voltage $v_1$ on $LN_1$ appears as $v_5$ across $LN_5$ in accordance with the turns ratio. This voltage is applied to the capacitor C4 via a second diode CR2. When the switch Q1 is off, the negative voltage $V_1$ across $LN_1$, $V_{in} - V_{out}$, as determined by the turns ratio, is applied to $LN_6$ as $v_6$. This voltage will add to the voltage across C4 and the voltage across C5 minus the diode drop across CR3 and is output as $V_{o2}$. Thus, windings $LN_5$ and $LN_6$ detect the peak-to-peak voltage across $LN_1$ (which is the output voltage $V_{out}$). Since $V_{out}$ is regulated, these windings provide a second regulated output voltage $V_{o2}$ which is applied to the pulse width modulator as a housekeeping supply, along with the output voltage $V_{out}$. Thus, neglecting rectifier voltage drops:

$$V_{o2} = (N_5/N_1)V_{in} - N_6/N_1(V_{in} - V_{out}) \qquad [11]$$

and $$\begin{aligned} V_{o2} &= (N_6/N_1)V_{out} + V_{in}(N_5 - N_6)/N_1 \\ &= N_6 V_{out}/N_1, \text{ when } N_5 = N_6 \end{aligned} \qquad [12]$$

where $N_5$ and $N_6$ which are the number of turns in the windings of $LN_5$ and $LN_6$ respectively. Hence, winding $LN_5$ and $LN_6$ provide a regulated auxiliary low voltage output.

FIGS. 4(a) through 4(i) illustrate steady state voltage and current waveforms in the coupled inductor circuit 50 of FIG. 3. With $N_1 = N_2 = N_3$, the voltage waveforms are all equal and in-phase as shown.

Hence, the inductor coupled DC to DC converter of the present invention provides conventional energy storage, power switch drive level shifting, input current ripple cancellation, and regulated low voltage auxiliary power supply generation with a single magnetic component. The invention allows for a significant reduction in parts count, unit size and cost over comparable prior designs.

Thus, the present invention has been described herein with reference to a particular embodiment for a particular application. Those having ordinary skill in the art and access to the present teachings will recognize additional modifications applications and embodiments within the scope thereof. While the windings are shown in the drawings as having ferrite cores, those having ordinary skill in the art will recognize that other types of cores or windings without cores of any kind may be used depending on the characteristics desired for the windings for a particular application.

It is therefore intended by the appended claims to cover any and all such applications, modifications and embodiments within the scope of the present invention.

Accordingly,

What is claimed is:

1. A coupled inductor type boost DC to DC converter comprising:
   a switching element for converting an input DC voltage to a signal having a time varying waveform, said switching element including a switch having a control terminal and first and second throw terminals; and
   a first inductive element having:
      a first winding connected between said first throw terminal of said switch and an input terminal of said converter,
      a second winding connected between said second throw terminal of said switch and an output terminal of said converter, and
      a third winding connected at a first end to said control terminal of said switch, to thereby provide a level shifter for shifting the level of a drive signal applied to said control terminal of said switch.

2. The invention of claim 1 wherein said level shifter includes a pulse width modulator circuit connected to a second end of said third winding of said first inductive element.

3. The invention of claim 2 wherein said level shifter further includes a driver connected in series between said pulse width modulator circuit and said second end of said third winding of said first inductive element.

4. The invention of claim 1 further including an auxiliary regulated power supply circuit.

5. The invention of claim 4 wherein said auxiliary power supply circuit includes a fourth winding of said first inductive element connected at one end to a source of reference potential.

6. The invention of claim 5 wherein said auxiliary power supply circuit includes a first diode connected at a first end to a second end of said fourth winding of said first inductive element.

7. The invention of claim 6 wherein said auxiliary power supply circuit includes a fifth winding of said first inductive element, connected at a first end thereof to a second end of said first diode.

8. The invention of claim 7 wherein said auxiliary power supply circuit further includes a capacitor connected to said second end of said first diode.

9. The invention of claim 8 wherein said auxiliary power supply circuit further includes a second diode connected at a first end to a second end of said fifth winding of said first inductive element and at a second end to an output terminal of said auxiliary power supply circuit.

10. The invention of claim 9 wherein said auxiliary power supply circuit further includes a second capacitor connected between said second end of said second diode and said source of reference potential.

11. The invention of claim 1 further including a ripple cancellation circuit including a fourth winding of said first inductive element connected at a first end to said first throw terminal of said switch and at a second end to a source of reference potential.

12. The invention of claim 11 wherein said ripple cancellation circuit further includes a second inductive element connected in series with said fourth winding of said first inductive element.

13. The invention of claim 12 wherein said ripple cancellation circuit further includes a first capacitor connected in series with said fourth winding of said first inductive element.

14. A coupled inductor type boost DC to DC converter comprising:
a switching element for converting an input DC voltage to a signal having a time varying waveform, said switching element including a switch having a control terminal and first and second throw terminals; and
a first inductive element having:
a first winding connected between said first throw terminal of said switch and an input terminal of said converter,
a second winding connected between said second throw terminal of said switch and an output terminal of said converter; and
an auxiliary regulated power supply circuit including a third winding of said first inductive element connected at one end to a source of reference potential, a first diode connected at a first end to a second end of said third winding of said first inductive element, a fourth winding of said first inductive element, connected at a first end thereof to a second end of said first diode, a capacitor connected to said second end of said first diode, and a second diode connected at a first end to a second end of said fourth winding of said first inductive element and at a second end to an output terminal of said auxiliary power supply circuit.

15. The invention of claim 14 wherein said auxiliary power supply circuit further includes a second capacitor connected between said second end of said second diode and said source of reference potential.

16. The invention of claim 14 further including a fifth winding connected at a first end to said control terminal of said switch for shifting the level of a drive signal applied to said control terminal of said switch.

17. The invention of claim 14 further including a fifth winding of said first inductive element connected at a first end to said first throw terminal of said switch and at a second end to said source of reference potential to thereby provide a ripple cancellation circuit.

18. The invention of claim 17 further including a second inductive element connected in series with said fifth winding of said first inductive element.

19. The invention of claim 18 further including a first capacitor connected in series with said fifth winding of said first inductive element.

20. A coupled inductor type boost DC to DC converter comprising:
a switching element for converting an input DC voltage to a signal having a time varying waveform, said switching element including a switch having a control terminal and first and second throw terminals; and
a first inductive element having:
a first winding connected between said first throw terminal of said switch and an input terminal of said converter,
a second winding connected between said second throw terminal of said switch and an output terminal of said converter, and
a ripple cancellation circuit including a third winding of said first inductive element connected at a first end to said first throw terminal of said switch and at a second end to a source of reference potential.

21. The invention of claim 20 wherein said ripple cancellation circuit further includes a second inductive element connected in series with said third winding of said first inductive element.

22. The invention of claim 21 wherein said ripple cancellation circuit further includes a first capacitor connected in series with said third winding of said first inductive element.

23. A coupled inductor type boost DC to DC converter comprising:
a switching element for converting an input DC voltage to a signal having a time varying waveform, said switching element including a switch having a control terminal and first and second throw terminals;
a first inductive element having:
a first winding connected between said first throw terminal of said switch and an input terminal of said converter,
a second winding connected between said second throw terminal of said switch and an output terminal of said converter.

* * * * *